ated themselves between the surfaces whose
UNITED STATES PATENT OFFICE.

ANDREW H. SMITH, OF NEW YORK, N. Y.

LUBRICANT.

SPECIFICATION forming part of Letters Patent No. 646,548, dated April 3, 1900.

Application filed July 24, 1899. Serial No. 725,019. (No specimens.)

*To all whom it may concern:*

Be it known that I, ANDREW H. SMITH, of the city, county, and State of New York, have invented a new and useful Improvement in Lubricating Substances, of which the following is a true and accurate description.

My object is to produce an inexpensive and efficient lubricant for the axles of vehicles or for use wherever a semifluid lubricant can be employed.

The lubricant which I have invented is produced by mixing fish-scales with oil, grease, tar, petroleum, or other lubricating substance or compound, either animal, vegetable, or mineral. The scales are used in their natural condition, preferably being simply incorporated with an oleaginous or unctuous material in such proportion that their surfaces shall be covered thoroughly with the same, and thus be made to glide easily upon each other and upon the bearing-surfaces between which they may be interposed. The scales being hard, smooth, and flexible, and very thin, especially at their edges, readily insinuate themselves between the surfaces whose friction upon each other it is desired to prevent. At the same time the oily material employed adheres to the scales and is thus prevented from escaping from the bearing-surfaces.

Experience shows that the scales gradually wear away and finally form with the greasy material a homogeneous semifluid substance having marked lubricating properties. For use in cases in which there is little space for a lubricant (the bearing-surfaces fitting closely to each other) it may be found advantageous to reduce the scales to a powder before mixing or to mix first and then run the mixture through a paint-mill.

I have thus discovered and demonstrated that fish-scales, heretofore a waste material of no value except, perhaps, as a fertilizer, can be utilized as above described, producing at a small cost an efficient and valuable lubricant.

What I claim as new, and desire to secure by Letters Patent, is—

The herein-described lubricant consisting of fish-scales combined with oil or other suitable agent.

ANDREW H. SMITH.

Witnesses:
RICHARD W. BENNETT,
J. P. REGAN.